March 17, 1942.  K. K. BOWMAN ET AL  2,276,822
TEMPERATURE CONTROL SYSTEM
Filed Dec. 19, 1939
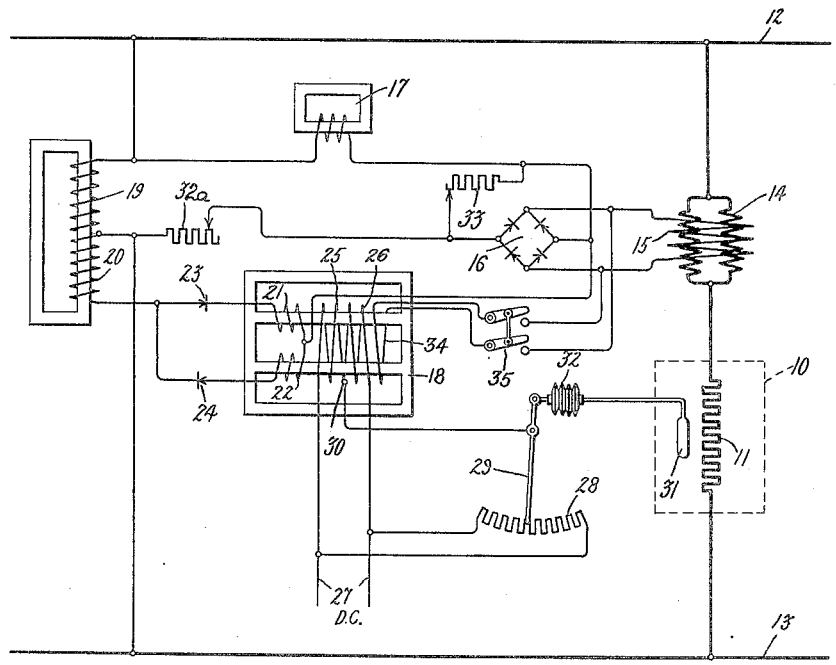
Inventors:
Kenneth K. Bowman,
Martin A. Edwards,
by Harry E. Dunham
Their Attorney.

Patented Mar. 17, 1942

2,276,822

UNITED STATES PATENT OFFICE 2,276,822

TEMPERATURE CONTROL SYSTEM

Kenneth K. Bowman and Martin A. Edwards, Scotia, N. Y., assignors to General Electric Company, a corporation of New York Application December 19, 1939, Serial No. 310,022

2 Claims. (Cl. 171—242)

This invention relates to temperature control systems used in the control of electric heating devices, such as furnaces, ovens and the like, and has for its object a simple and reliable system giving close regulation of the temperature.

In carrying out our invention in one form, we utilize a saturable core reactor for controlling the current input to the furnace or other heating apparatus together with a partially self-saturated control reactor connected in a Wheatstone bridge circuit. The saturation of this control reactor is varied in response to the temperature of the furnace so as to control the balance of the bridge and thereby vary the saturation of the furnace reactor.

For a more complete understanding of our invention, reference should be had to the accompanying drawing, the single figure of which shows in diagrammatic form a furnace control system embodying our invention.

Referring to the drawing, we have shown our invention in one form as applied to an electric furnace 10 provided with a heating resistor 11 which is supplied with energy from suitable alternating current supply mains 12 and 13. The energy supplied to the resistor is controlled by a suitable saturable iron core energy supply reactor 14 having its windings connected in series circuit with the resistor 11. This reactor can be magnetically saturated to the desired degree to vary its impedance by supplying a direct current to a saturating winding 15. In this way the energy supplied to the resistor 11 is varied. For the purpose of preventing transformer action between the reactor windings and coil 15, two parallel connected, oppositely wound reactor windings mounted on separate core legs are used with the coil 15 surrounding the two.

Direct current is supplied to the winding 15 from the mains 12 and 13 through a two-way valve or rectifier 16, shown as consisting of four rectifiers of the copper oxide type, which rectifier is connected across the equipotential points of a Wheatstone bridge. The bridge comprises an iron core bridge reactor 17 having a predetermined fixed reactance, a variable control reactor 18, a transformer winding 19 connected across the mains 12 and 13 and a transformer winding 20 inductively coupled with the winding 19.

The control reactor 18 is a partially self-saturated, intermittent direct current type reactor. As shown, it comprises a four-legged iron core, on the two middle legs of which are wound respectively two reactor windings 21 and 22 having the same number of turns. These two windings are connected in parallel in the Wheatstone bridge circuit through two reversely connected one-way current rectifiers or valves 23 and 24. Thus one of the rectifiers, such as 23, passes current during one-half of the alternating current wave and sets up a flux in a given direction in its core leg of the coil 21 while the other rectifier 24 passes current during the remaining half of the current wave whereby the coil 22 sets up a flux in its core leg. The two coils are connected so that the fluxes set up by these intermittent direct currents in them are in the same direction, for example, from left to right as seen in the drawing.

Furthermore, the two reactors 17 and 18 are so constructed as to have reactances such as normally to balance the bridge. The exciting current for these reactors with the bridge balanced is sufficient to partially saturate the core of the control reactor 18 to a predetermined value of saturation. In view of the fact that alternating current passes through the winding of the reactor 17, its core is supplied with an alternating magnetic flux.

For the purpose of controlling the saturation of the control reactor 18, two reversely wound direct current saturating coils or windings 25 and 26 are provided, each surrounding the two core legs for the coils 21 and 22. These coils have the same number of turns and are connected in series with each other across suitable direct current supply mains 27, the coils being connected in magnetic opposition to each other so that under normal conditions they do not set up any magnetic flux in the core.

To control the reactor 18, the energization of these two windings 25 and 26 is varied so that one or the other predominates. This is effected by means of a variable potentiometer resistor 28 connected across the D. C. supply mains 27 and provided with a movable contact arm or tap 29 which is connected to the junction point 30 between the two coils 25 and 26. It will be observed that movement of the contact arm increases the energization of one coil while at the same time decreasing the energization of the other. The contact arm 29 is moved in response to temperature by suitable means responsive to the temperature of the furnace 10, this being shown as a liquid or gas filled device consisting of a bulb 31 in the furnace communicating with an expansion bellows 32 connected to the contact arm.

In the operation of the system, the temperature responsive bellows 32 is adjusted as by a suitable spring, not shown, to hold the contact arm 29 in such position on the resistor 28 when the furnace is at the desired predetermined temperature to be maintained that the saturation of the reactor 18 is just sufficient to supply the required amount of energy to the resistor 11 to maintain that furnace temperature. This is effected by an unbalance of the coils 25 and 26 so as to create a flux in the core of the reactor 18 in the same direction as the flux generated by the coils 21 and 22. It will be assumed that this increased flux and increased saturation is given by a predominate excitation of the coil 25. The contact arm 29 is then, substantially as shown in the drawing, somewhat nearer the left-hand end of the resistor 28 and connects the predominating coil 25 across a greater portion of the resistor 28.

Assuming now a decrease in furnace temperature such as might be caused by a recharging of the furnace, the bellows 32 moves the contact arm 29 farther toward the left so as to increase the energization of the coil 25 and still further saturate the control reactor 18. The increased saturation still further reduces the reactance of the reactor 18 and consequently reduces the impedance voltage drop across it with the result that the bridge is further unbalanced and an increased current supplied by the rectifier 16 to the saturating winding 15 whereby the saturation of the reactor 14 is increased, its impedance drop decreased, and more current supplied to the furnace resistor 11. As the furnace temperature increases, the contact arm 29 is moved back toward the right to a position in which the energy input to the resistor 11 just equals the heat loss from the furnace. This equilibrium condition is obtained gradually with a slowly decreasing energy input to the furnace so that the predetermined temperature condition is reestablished with very little overshooting of temperature.

In the event that the temperature becomes higher than the predetermined temperature, the contact arm 29 is moved farther toward the right so that the assumed coil 25 is less predominating, or the temperature increase may be great enough to cause the coil 26 to predominate and thus produce a magnetic flux in the opposite direction. As a result, the flux in the control reactor 18 is decreased whereby the impedance of the reactor is increased and the current in the winding 15 reduced to decrease the energy supplied to the resistor 11. The impedance of the reactor 18 is already so high, however, that when the coil 26 produces an opposing flux reducing the flux in the reactor 18 below the predetermined value produced by the coils 21 and 22 substantially no further voltage unbalance of the bridge occurs and substantially no current is supplied to the winding 15. In other words, the bridge is substantially unresponsive to temperatures much greater than the predetermined temperature to be maintained. The full reactance or substantially the full reactance of the reactor 14 is thereby introduced in circuit with the resistor 11 which reduces the current supplied to the resistor 11 to a very low value insufficient to maintain the furnace temperature. The furnace temperature therefore drops and the contact arm 29 is adjusted to return to the equilibrium condition.

An important factor in the non-reversibility of the bridge at temperatures higher than the predetermined temperature to be maintained and consequent lack of response of the bridge to such high temperatures is the cumulative boosting or bucking action of the coils 21, 22 with respect to the coils 25, 26. Under normal temperature conditions the flux in the reactor 18 is in the direction of the flux produced by the coils 21, 22, and the coils 21, 22 act to boost the effect of any change in the net excitation supplied to the coils 25, 26. Thus when the net excitation of the coils 25, 26 is decreased, the flux in the reactor 18 decreases, and its impedance increases producing a decrease in the current in coils 21, 22. This produces a still further decrease in the flux and increase in the impedance of the reactor. The opposite cumulative action takes place in the event that the net excitation of the coils 25, 26 is increased. It should be noted that the coils 21, 22 are supplied with intermittent direct current and consequently the values of these currents are dependent upon the impedance of the reactor.

On the other hand, when the coil 26 is excited in response to relatively high temperatures to such an extent that it reverses the magnetic flux in the reactor 18, the coils 21, 22 buck any change in the excitation of the coil 26. In that case any increase in the excitation of the coil 26 decreases the impedance of the reactor whereupon the excitation of the coils 21, 22 increases and opposes the increased excitation of the coil 26 which produced the change. This bucking action is effective to prevent any substantial decrease in the impedance of the reactor 18 by reversed flux set up by the coil 26 even at furnace temperatures much higher than the predetermined temperature.

This condition of a relatively high furnace temperature might result from adjustment of the temperature responsive device 31, 32 to maintain a low predetermined furnace temperature at a time when the furnace is heated to a relatively high temperature. In such case, the control operates to supply only a small amount of current to the heating resistor, too small to maintain the furnace temperature. Consequently, the furnace cools to the lower operating temperature. In a typical installation having reactors 17, 18 with substantially equal impedances when the bridge was balanced, the impedance of the reactor 18 when the arm 29 was in its extreme right-hand position, i. e., high temperature position, was only slightly less than the impedance of the reactor 17. Therefore, no substantial amount of current was supplied to the coil 15.

It will be understood, of course, that with varying heat requirements of the furnace, the predetermined temperature maintained will vary somewhat from the predetermined temperature for which the control apparatus is adjusted. In other words, there must be some slight drop in temperature from the predetermined temperature in order to cause the control to supply an increased amount of energy to the furnace. In a typical furnace, however, the predetermined temperature was held within five degrees C. plus or minus.

A variable resistor 32a is provided across the bridge in series with the rectifier 16 whereby the current supplied by the rectifier for a predetermined voltage unbalance of the bridge can be varied. This adjusts the sensitivity of the control. In other words, it adjusts the temperature drop required to give a predetermined increase in energy input to the furnace. The greater the resistance 32a included in the circuit, the lower the sensitivity and the greater temperature change required. A similar adjustment is provided by a variable resistance 33 connected in parallel with the rectifier 16.

For the purpose of increasing the sensitivity of the control, a feed-back coil may be provided on the two middle legs of the reactor 18 and connected in parallel with the coil 15 so as to assist the coil 25 in increasing the saturation of these legs. For purposes of illustration, we have shown a coil 34 thus mounted on the two middle legs and arranged to be connected by means of the switch 35 in parallel with the coil 15. The number of turns of this coil 34 and its energization are so arranged that the change in temperature and movement of the contact arm 29 required for a given change in the energy input to the furnace is suitably reduced.

While we have shown a particular embodiment of our invention, it will be understood, of course, that we do not wish to be limited thereto, since many modifications may be made and we, therefore, contemplate by the appended claims to cover any such modifications as fall within the true spirit and scope of our invention.

What we claim as new and desire to secure by Letters Patent of the United States is:

1. A control system for an energy translation device comprising a control reactor provided with a magnet core having at least three legs with their opposite ends magnetically connected together so that said three legs are in parallel magnetic circuits, two exciting windings mounted respectively on two of said legs, a one-way current rectifier connected to one terminal of each of said windings, electrical connections between said windings connecting similar terminals of said windings to each other so as to form two common points of connection forming terminals between which said windings are connected in parallel with each other each in series with one of said rectifiers, a second reactor, connections connecting said reactors in a bridge circuit, connections for supplying an alternating potential to said bridge circuit, said rectifiers being oppositely connected with respect to said terminals so that said rectifiers pass half wave currents alternately and said windings being connected to produce magnetic fluxes in the same direction through the third leg of said core when energized by said half wave currents, control means responsive to voltage unbalance of said bridge for varying a characteristic of an energy translating device, two excitation control windings mounted on said magnet core in position to be interlinked by the total magnetic flux produced by said two exciting windings, a common connection between two terminals of said excitation control windings reversely connecting said windings in series with each other, connections for supplying a direct current voltage to the remaining two terminals of said excitation control windings, an electric resistor connected across said two terminals, an adjustable contact on said resistor electrically connected to said common connection of said two excitation control windings, and means responsive to a change in said characteristic of the energy translating device from a predetermined value for moving said contact thereby to vary the relative excitations of said two excitation control windings so as to boost or oppose the magnetic flux in said core and thereby produce a voltage applied to said control means to bring said characteristic back to said predetermined value.

2. A control system for an energy translation device comprising a voltage supply winding having a central tap, a magnet core provided with at least three legs having their opposite ends magnetically connected together so that said three legs constitute parallel connected magnetic circuits, two exciting windings mounted respectively on two of said legs, a one-way current rectifier connected to one terminal of each of said windings, electrical connections between said windings connecting similar terminals of said windings to each other so as to form two common points of connection between which said windings are connected in parallel with each other each in series with one of said rectifiers, said rectifiers being oppositely connected with respect to each of said common points of connection so that said rectifiers pass half wave currents alternately and said windings being connected to produce magnetic fluxes in the same direction through the third leg of said core when energized by said half wave currents, an electrical connection between one of said common points of connection and one terminal of said transformer winding, a second reactor coil having one of its terminals connected to the other terminal of said transformer winding, a third common point of connection between the other common point of connection of said exciting windings and the other terminal of said second reactor, an electrical connection between said third common point of connection and said central tap of said transformer winding including a reactor control winding and rectifier means for causing a two-way current to flow through said control winding in response to the voltage between said third common point and said central tap, a third reactor controlled by the current in said control winding thereby to vary a characteristic of an energy translating device, two excitation control windings mounted on said magnet core in position to be interlinked by the total magnetic flux produced by said two exciting windings, a common connection between two terminals of said excitation control windings reversely connecting said windings in series with each other, connections for supplying a direct current voltage to the remaining two terminals of said excitation control windings, an electric resistor connected across said two terminals, an adjustable contact on said resistor electrically connected to said common connection of said two excitation control windings, and means responsive to a change in said characteristic of the energy translating device from a predetermined value for moving said contact thereby to vary the relative excitations of said two excitation control windings so as to boost or oppose the magnetic flux in said core and thereby produce a voltage applied to said control winding to bring said characteristic back to said predetermined value.

KENNETH K. BOWMAN.
MARTIN A. EDWARDS.